G. K. BURTON AND W. H. STOLPE.
CRANK PIN ROUNDING AND TRUING TOOL.
APPLICATION FILED JUNE 17, 1919.
1,333,605.
Patented Mar. 16, 1920.
2 SHEETS—SHEET 2.
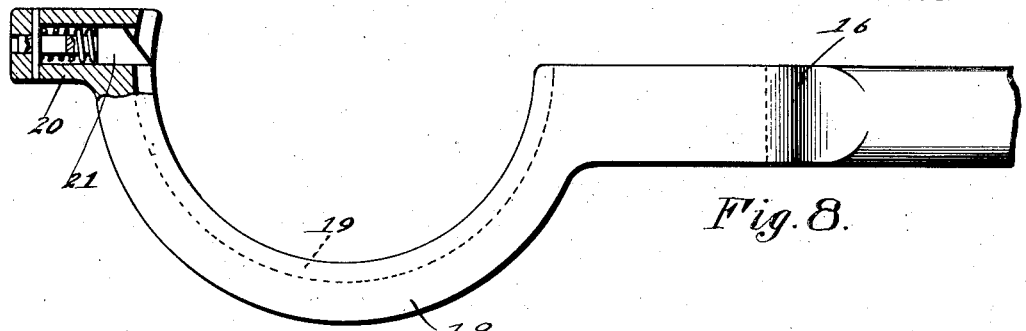
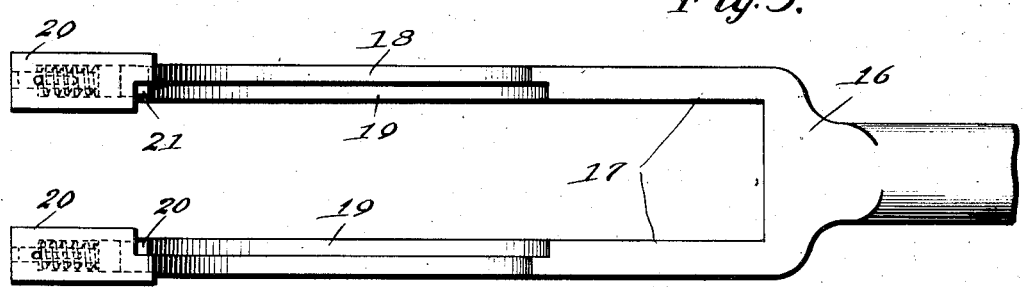
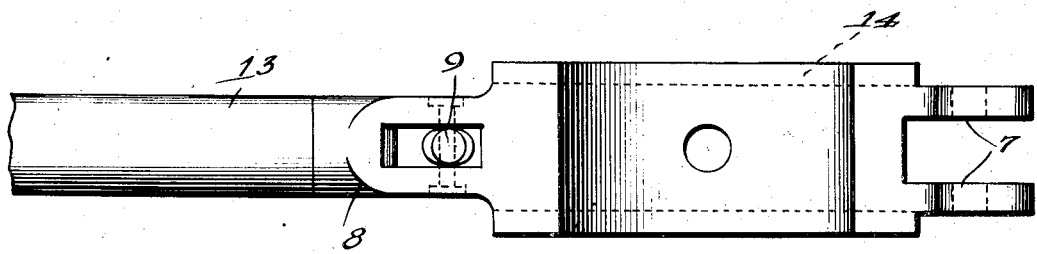
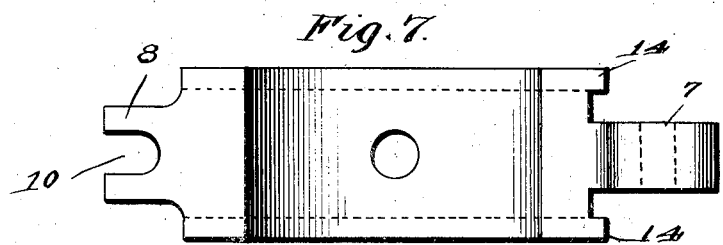
Inventors
G. K. Burton
W. H. Stolpe
By Victor J. Evans
Attorney
Witnesses
R. A. Thomas

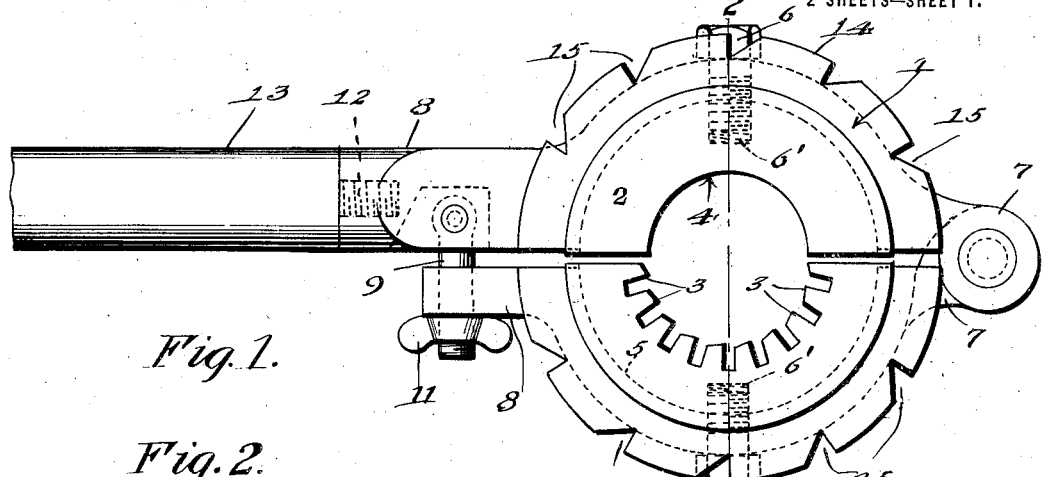
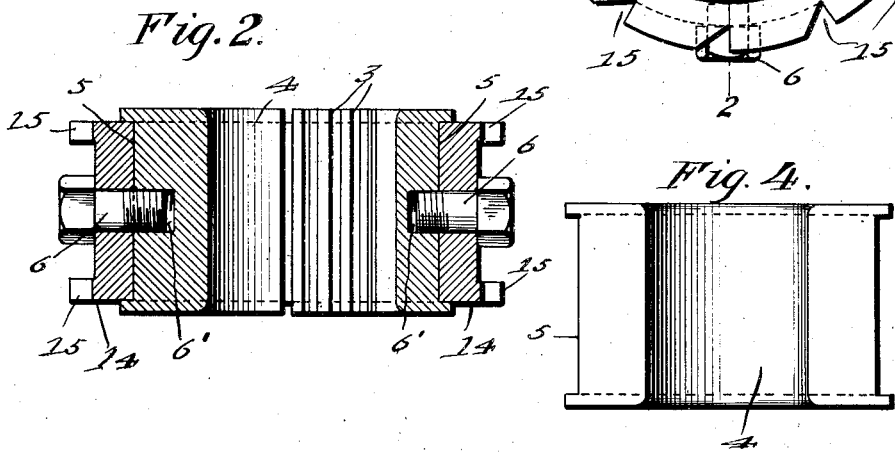
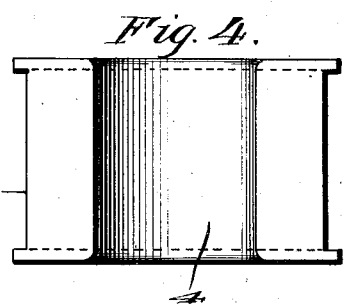
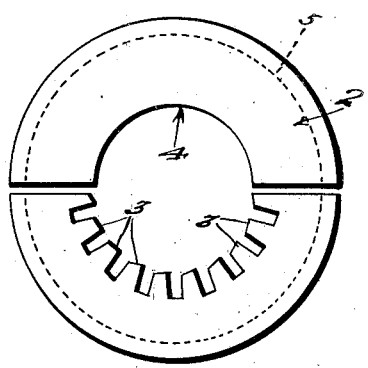
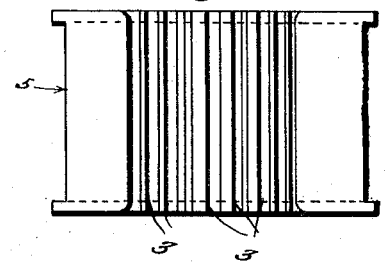

UNITED STATES PATENT OFFICE.

GARRY K. BURTON AND WILLIAM H. STOLPE, OF TOPEKA, KANSAS.

CRANK-PIN ROUNDING AND TRUING TOOL.

1,333,605.  Specification of Letters Patent.  Patented Mar. 16, 1920.

Application filed June 17, 1919. Serial No. 304,752.

*To all whom it may concern:*

Be it known that I, GARRY K. BURTON and WILLIAM H. STOLPE, citizens of the United States, residing at Topeka, in the county of Shawnee and State of Kansas, have invented new and useful Improvements in Crank-Pin Rounding and Truing Tools, of which the following is a specification.

The invention relates to tools for truing crank pins and the like and the principal object of the invention is to provide cutting devices which may be adjusted to cut the pin to the desired size.

Another object of the invention is to provide means whereby the pin may be rounded by the tool without removing the crank shaft from the engine.

The invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like or corresponding parts throughout the several views, and in which:—

Figure 1 is an end view of the complete device;

Fig. 2 is a section on line 2—2 of Fig. 1;

Fig. 3 is a view of the cutting ring;

Fig. 4 is an edge view of one part of this cutting ring;

Fig. 5 is a like view of the other part;

Fig. 6 is an edge view of one of the parts of the holder;

Fig. 7 is a like view of the other part of the holder;

Fig. 8 is a side view of the ratchet member for operating the tool;

Fig. 9 is an edge view of this member.

In these views 1 indicates the holder which carries the cutting ring 2. This ring is composed of two semi-circular halves, one of which has its inner face provided with the cutting teeth 3 while the other part has its inner face smooth as at 4. This face 4 acts as a guide and gage. The teeth may be formed of square shape, as shown, or they may be formed of spiral shape or corrugated as "mill file" type. The ring has its outer periphery of channel shape, as at 5 and each part of the ring is provided with a screw-threaded hole 6' which extends inwardly from the bottom of said channel and these holes are located midway the ends of said parts. The holder 1 engages the channel in the ring and said holder carries the bolts 6 which engage the holes 6' to connect the two parts of the ring to the holder. The holder is also formed of two halves, each half being provided with the hinged part 7 by which the two parts may be hinged together. At their opposite ends the two parts are provided with the projections 8 one of which carries the bolt 9 and the other being provided with a recess 10 for receiving the end of the bolt and a thumb nut 11 engages said bolt so that the two parts of the holder may be held together with the ring between them. One of the projections 8 is provided with a screw-threaded hole 12 which is adapted to receive the screw-threaded end of a handle 13 by which the device may be actuated.

The holder is provided with side flanges 14 on its outer circumference and these flanges are provided with the ratchet notches 15. An operating member 16 is provided with a fork 17, the legs of the fork each being provided with a semicircular portion 18 for engaging a half of the holder. These semicircular portions are provided with the grooves 19 in which the flanges 14 fit and the extended parallel ends 20 of the legs of the fork carry the spring pressed dogs 21 which are adapted to engage with the ratchet notches 15 in the flanges so that the device may be rotated on the crank pin by the ratchet member without removing the crank shaft from the motor. It will be understood that when this ratchet member is used the handle 13 is removed as said handle is only used when the device may be rotated a full revolution around the pin.

It will thus be seen that the device will accurately true a crank pin or journal and the adjustment is such that this action may be carried out to the fineness of one ten-thousandth of an inch. The device is operated by hand and requires no other equipment to true a crank pin or journal. As has hereinbefore been set forth the face 4 acts as a guide and gage. This is due to the fact that when the two semicircular halves of the cutting ring 2 have been moved toward each other to their limit of movement, the surface 4 and the cutting teeth 3 complementally describe a true circle. It will, therefore, be seen that no damage to the crank pin can be done by an inexperienced or careless workman because after the proper degree of cut has been made to bring the face 4 to a complete seating upon the crank pin it is impossible to cut any further. This is not true of any other device at present known to us. Furthermore, it is to be observed that the necessary movement is imparted to the structure by the handle 16 by only such limited back and forth movement of said handle as may be accomplished through the bottom of the crank case of an engine.

It is thought from the foregoing description that the advantages and novel features of our invention will be readily apparent.

We desire it to be understood that we may make changes in the construction and in the combination and arrangement of the several parts, provided that such changes fall within the scope of the appended claims.

What we claim is:—

1. A device of the class described comprising a cutting ring formed of two parts, one part having cutting teeth on its inner face and the other part having its inner face smooth, a holder for the ring composed of two parts hinged together, means for adjusting the holder to adjust the ring and a handle for actuating the holder.

2. A device of the class described comprising a cutting ring composed of two parts, one part having cutting teeth on its inner face, a holder composed of two parts hinged together, means for detachably connecting each part of the ring to a part of the holder and means for adjustably connecting the two parts of the holder together.

3. A device of the character described comprising an element consisting of two parts shaped to complementally embrace a crank to be trued, one of said parts presenting to the crank a smooth, semicircular surface of fixed circumference constituting a gage and a guide which extends substantially half way around the crank and the other of said parts presenting to said crank a cutting surface adapted to act upon said crank, said parts being movable toward and from each other, the limit of movement of the parts toward each other being reached when the gage and cutting surface complementally form a true circle.

4. A structure as recited in claim 3 in combination with a holder for the same and means for bodily rotating the holder.

5. A structure as recited in claim 3 in combination with a two part holder for the same, means for hinging the two parts of the holder together at one side thereof and means carried by the holder at the opposite side thereof for drawing the two parts together.

6. A structure as recited in claim 3 in combination with a holder for said element and a freely removable, manually operable member and interengaging means between said member and the holder whereby the holder may be given a bodily rotation.

7. A structure as recited in claim 3 in combination with a holder for said element and a freely removable, manually operable handle, and pawl and ratchet connections between said handle and the holder for giving a continuous bodily rotation to the holder by a back and forth movement of the handle.

8. A device of the character described comprising an element consisting of two parts which complementally embrace a crank to be turned, one of said parts presenting to the crank a smooth, semicircular surface of fixed circumference constituting a guide and gage extending substantially half way around the crank and the other of said parts presenting to said crank a cutting surface adapted to act upon said crank, a two part holder, the parts of which are hingedly connected at one side of said element, means for drawing the two parts of the holder together at the opposite side of said element, ratchet teeth formed upon the holder and a manually operable pawl carrying handle adapted to engage said ratchet teeth, said handle comprising a semicircular portion corresponding in size to the holder and adapted to have a bearing upon said holder for the guidance of said handle.

In testimony whereof we affix our signatures.

GARRY K. BURTON.
WILLIAM H. STOLPE.